May 10, 1955  R. B. COLT  2,708,256
MOTOR SLACK TAKE-UP AND TENSIONING MECHANISM
FOR TRAVELLING FLEXIBLE MEMBER
Original Filed Oct. 24, 1946
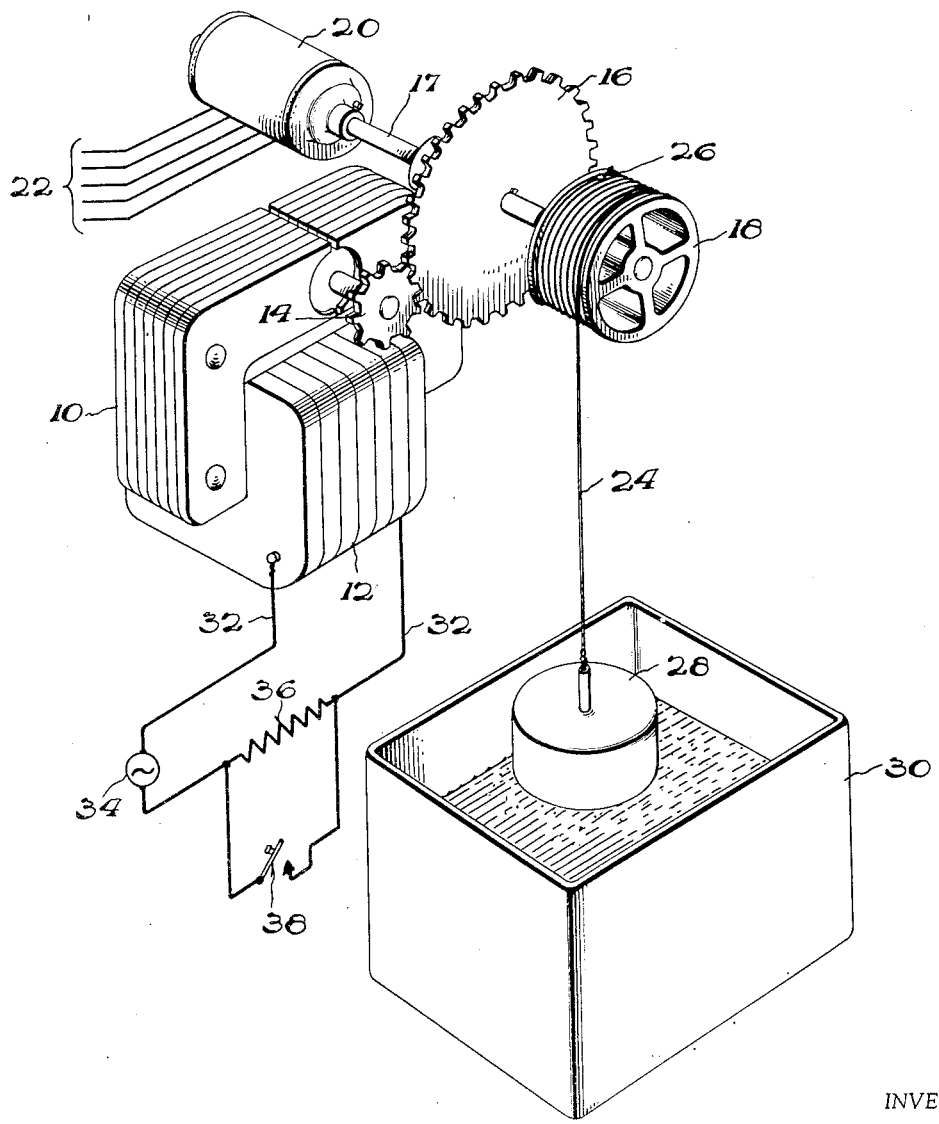
INVENTOR
Rutger B. Colt.
BY Robert F. Peck
ATTORNEY

United States Patent Office 2,708,256
Patented May 10, 1955

2,708,256

MOTOR SLACK TAKE-UP AND TENSIONING MECHANISM FOR TRAVELLING FLEXIBLE MEMBER

Rutger B. Colt, Baltimore, Md., assignor to Bendix Aviation Corporation, Baltimore, Md., a corporation of Delaware Original application October 24, 1946, Serial No. 705,410. Divided and this application June 12, 1951, Serial No. 231,209

1 Claim. (Cl. 318—6)

This invention relates to a novel take-up mechanism for a travelling flexible member in which a stalled electric motor continuously furnishes sufficient torque to a take-up drum whereby a travelling flexible member is maintained under tension and is a division of my copending application Serial Number 705,410 filed October 24, 1946.

In my aforesaid copending application, the novel mechanism disclosed herein was shown as part of a liquid level indicating system, but apart from its novel use therein, the mechanism has many applications other than in a liquid level system. For example, in the textile, printing, or condition recording arts, there are many applications wherein a travelling flexible member, usually in the form of a filament or a web, is fed onto a take-up member, usually in the form of a drum, and some means must be provided for maintaining the travelling member under tension.

It has been found that a stalled electric motor has excellent inherent characteristics for use in a take-up mechanism and when suitably linked to a take-up drum, a travelling member fed onto the drum can be maintained under continuous tension at the same time it is being taken up by the drum. Further, if the driving force causing the member to move is reduced to nothing, the member will continue to remain under tension because of the continuous torque furnished to the take-up drum by the stalled motor. Additionally, and of added significance, the travelling member can undergo a reverse motion, for the purpose of permitting inspection of any portion of the member previously taken-up on the take-up drum or for any other purpose, and this reverse motion of the member will in no way affect the operating characteristics of the stalled motor. This last named advantage deriving from the use of the novel take-up mechanism disclosed herein has particular importance in the condition recording art wherein a chart in the form of a travelling paper web continuously moves in relation to a recording device (such as a pen or some form of printing means) and is taken up on a suitable take-up drum. The chart can easily be partially or substantially wholly unwound from the take-up drum to permit inspection of any selected period of recording, and such action will in no way interfere with the chart feed or take-up mechanism. When the inspection operation is completed, the chart can easily be fed back onto the take-up drum by reason of the continuous torque furnished by the stalled motor.

The invention will be described in conjunction with the single sheet of drawings annexed hereto in which the single figure shows an application of the novel take-up mechanism to a liquid level indicating system.

In the drawing, there is illustrated a motor 10 of the shaded pole type having an exciting winding 12. The rotor of the shaded pole motor 10 carries on its shaft a pinion 14 meshing with the driving gear 16 secured to a shaft 17 linking the take-up drum 18 and self-synchronous transmitter 20. The conductors 22 connnect the self-synchronous transmitter 20 to the usual energizing and indicating circuits.

A flexible member 24, which, in the embodiment of the invention disclosed is in the form of a filament or cable, has one end connected to the drum 18 at 26 and the other end attached to a float 28. The float 28, in the example shown, is suspended over a standpipe 30 partially filled with the liquid whose level is to be indicated. The shaded pole motor 10 is provided with a pair of power input leads 32 which are connected to a source 34 of electric energy in series with a resistor 36. The resistor 36 is shunted by a single-pole, single-throw switch 38 which may be of the momentary, normally open variety. The operation of the take-up mechanism is as follows:

With the switch 38 open, the power input to the motor 10 is limited and the torque produced thereby is of a value less than that required to raise the float 28 from the surface of the liquid in the standpipe 30. This torque maintains the connecting member 24 under tension. As the liquid level rises, the float 28 will act as a driving force on the end of member 24 attached thereto and cause the member 24 to move upwardly onto the drum 18. As heretofore stated, the torque furnished drum 18 by motor 10 will cause the drum 18 to take-up any slack in member 24 to thereby maintain tension on this member. As the liquid level falls, the weight of the float 28 overcomes the torque produced by motor 10, thereby permitting the member 24 to unwind from the drum 18. As explained in my aforementioned parent application, the rotation of drum 18 caused by take-up or take-off of member 24 causes rotation of shaft 17 and the movable element of the self-synchronous transmitter 20.

If it is found desirable to use the take-up mechanism as a means of raising float 28 from the standpipe, the switch 38 is closed to increase the power input to the motor 10 and increase the developed torque to a value overcoming the weight of the float 28 and raise it out of its normal position in the standpipe 30.

From the above, it will be seen that the flexible member 24 travels in response to the driving force developed by the action of float 28. The drum 18 will continuously take-up the slack in member 24 as it moves in a direction toward the drum to thereby maintain the member 24 under tension. If, for any reason, the member 24 is moved in a direction away from the drum 18, motor 10 will be driven in a direction reverse to its normal driving tendency thereby permitting the drum to unwind. Such a mode of operation will not affect the motor 10 and upon resumption of motion in a take-up direction by member 24, the motor will deliver the required amount of torque to take-up slack and maintain the member 24 under tension.

As heretofore stated, the invention disclosed and claimed herein has application and utility apart from its use in a liquid level indicating system. In addition to the printing and textile arts, the take-up mechanism is ideally adapted for use in the condition recording arts. In such an application, the flexible member 24 could be in the form of a paper web normally fed by a suitable paper-drive mechanism onto a take-up drum or roller. The take-up mechanism would take-up any slack in the paper web and maintain same under tension. The paper web could be unwound from the take-up drum, in opposition to the torque furnished by the stalled motor, to permit inspection of any selected period of recording. Thereupon the paper web could be released and the take-up mechanism would immediately take-up all slack and maintain the paper under proper tension for normal operation.

What is claimed and desired to be secured by United States Letters Patent is:

In mechanism of the class described, a drum having a flexible material wound thereon, means exerting a variable force on said material tending at times to unwind it from the drum, a shaft connected to said drum for rotation in synchronism with the drum, an electric motor which takes up flexible material slack in one direction of operation and imposes braking in the other having a rotor connected to said shaft for rotation in response to rotation of the shaft, the torque delivered by said shaft in response to unwinding of the material from the drum being in opposition to the torque acting on said rotor, said motor being electrically independent of said means tending to unwind the material from said drum.

References Cited in the file of this patent

UNITED STATES PATENTS

| | | |
|---|---|---|
| 916,721 | Kramer | Mar. 30, 1909 |
| 1,265,328 | Henderson | May 7, 1918 |
| 1,442,310 | Thompson | Jan. 16, 1923 |
| 2,629,261 | McKinney | Feb. 24, 1953 |